(12) United States Patent
Chang et al.

(10) Patent No.: US 12,466,843 B2
(45) Date of Patent: Nov. 11, 2025

(54) GADOLINIUM-BASED COMPOUND, METHOD FOR PRODUCING SAME, AND MRI CONTRAST AGENT CONTAINING SAME

(71) Applicant: KYUNGPOOK NATIONAL UNIVERSITY INDUSTRY-ACADEMIC COOPERATION FOUNDATION, Busan (KR)

(72) Inventors: Yong Min Chang, Daegu (KR); So Yeon Kim, Daegu (KR)

(73) Assignee: KYUNGPOOK NATIONAL UNIVERSITY INDUSTRY-ACADEMIC COOPERATION FOUNDATION, Busan (KR)

( * ) Notice: Subject to any disclaimer, the term of this patent is extended or adjusted under 35 U.S.C. 154(b) by 812 days.

(21) Appl. No.: 17/755,143

(22) PCT Filed: Sep. 29, 2020

(86) PCT No.: PCT/KR2020/013347
§ 371 (c)(1),
(2) Date: Apr. 21, 2022

(87) PCT Pub. No.: WO2021/085875
PCT Pub. Date: May 6, 2021

(65) Prior Publication Data
US 2022/0380386 A1 Dec. 1, 2022

(30) Foreign Application Priority Data

Oct. 29, 2019 (KR) .................. 10-2019-0134992
Sep. 8, 2020 (KR) .................. 10-2020-0114620

(51) Int. Cl.
*C07F 5/00* (2006.01)
*A61K 49/10* (2006.01)

(52) U.S. Cl.
CPC .............. *C07F 5/00* (2013.01); *A61K 49/108* (2013.01)

(58) Field of Classification Search
CPC .... A61K 49/108; A61K 49/10; A61K 49/085; C07B 59/004
See application file for complete search history.

(56) References Cited

FOREIGN PATENT DOCUMENTS

| CN | 106986920 | 7/2017 |
| KR | 20140125896 | 10/2014 |

OTHER PUBLICATIONS

Rivas et al., Inorg. Chem., 2013, 52, p. 14284-14293. (Year: 2013).*
Kumar, Eur. J. of Pharm. Sci., 2018, 117(30), p. 362-370. (Year: 2018).*
Nomikou et al., Chem. Commun., 2012, 48, p. 8332-8334. (Year: 2012).*
Harrison et al., "A multimeric MR-optical contrast agent for multimodal imaging." *Chemical communications* 2012, vol. 50, No. 78, pp. 11469-11471.
International Search Report and Written Opinion issued in Corresponding PCT Application No. PCT /KR2020/013347, dated Jan. 18, 2021.
Pietrancosta et al., "Rose Bengal analogs and vesicular glutamate transporters (VGLUTs)." *Bioorganic & medicinal chemistry* 2010, vol. 18, No. 18, pp. 6922-6933.
Stefanakis et al., "Synthesis and characterization of gadolinium nanosheets with bound rose bengal: Potential use in photodynmnic therapy and MRI." *Journal of nanoparticle research* 2014, vol. 16, No. 11, article No. 2694(pp. 1-9).

* cited by examiner

*Primary Examiner* — Michael G. Hartley
*Assistant Examiner* — Leah H Schlientz
(74) *Attorney, Agent, or Firm* — NORTON ROSE FULBRIGHT US LLP

(57) ABSTRACT

The present invention relates to a gadolinium-based compound of a Chemical Formula 1, a method for producing the same, and an MRI contrast agent containing the same. [Chemical Formula 1] [structural formula] In chemical formula 1, A and Linker represent linking groups, and RB represents a Rose Bengal-derived part.

20 Claims, 14 Drawing Sheets

GADOLINIUM-BASED COMPOUND, METHOD FOR PRODUCING SAME, AND MRI CONTRAST AGENT CONTAINING SAME

CROSS-REFERENCE TO RELATED APPLICATIONS

This application a national phase under 35 U.S.C. § 371 of International Application No. PCT/KR2020/013347, filed Sep. 29, 2020, which claims priority to Korean Patent Application No. 10-2019-0134992, filed Oct. 29, 2019, and Korean Patent Application No. 10-2020-0114620, filed Sep. 8, 2020. The contents of each of the referenced applications are incorporated into the present application by reference.

FIELD OF THE INVENTION

The present disclosure relates to a novel gadolinium-based compound, a method for preparation of the same, and an MRI contrast agent containing the same. Specifically, the present disclosure relates to a novel gadolinium-based compound having a structure in which a gadolinium complex and Rose Bengal are bonded to each other via a linking group, a method for preparing the same, and an MRI contrast agent containing the same.

DESCRIPTION OF RELATED ART

Today, the number of patients with degenerative brain disease is increasing due to the aging of the population. Accordingly, the need for early detection of the disease is emerging. Degenerative brain diseases include Parkinson's disease, vascular dementia, Alzheimer's disease, and the like. Neurotoxicity due to overexpression of glutamate is considered as one of the causes of the disease.

Glutamate is responsible for more than 70% of excitatory signaling in the human brain. The glutamate is an important amino acid that regulates learning, memory, motor performance, and emotion. Glutamate-induced excitatory signal transduction at synapses is tightly regulated by several glutamate transporters and receptors. The vesicular glutamate transporter (VGLUT) is known to play a key role in storage and concentration regulation of the glutamate in neuronal cells. Normally, the concentration of glutamate in the synaptic cleft is in a range of 1 to 3 µM. When the glutamate stored in the vesicle is released, the concentration thereof increases to hundreds to thousands of µM or higher. Therefore, when an abnormality occurs in VGLUT, the glutamate stored in the vesicle is abnormally excessively secreted. According to a recent study, it is reported that when the glutamate concentration is increased, reuptake thereof by neuroglia cells decreases, and thus glutamate accumulates in the neuronal synapse and causes toxicity, and induces generation of reactive oxygen species and oxidative stress to cause damage to nerve cells.

Further, recently, research results showed that the concentration of glutamate in the gyms or cerebrospinal fluid increased in the early stages of Alzheimer's disease, but as Alzheimer's progressed, nerve cells were damaged and the number thereof decreased. Therefore, it was expected that detecting changes in the concentration of glutamate would enable early diagnosis of degenerative brain diseases.

Magnetic Resonance Image (MRI) refers to a method of obtaining anatomical, physiological, and biochemical information images of the body using a phenomenon in which the distributions of hydrogen atoms in different tissues of the body are different from each other and the hydrogen atoms are relaxed in a magnetic field. Unlike CT or PET, MRI does not use radiation harmful to the human body and creates images inside the body using the gradient of the magnetic field and radio waves under a strong magnetic field. Thus, the MRI is non-invasive, has high resolution, and has excellent soft tissue examination capabilities.

In order to use the MRI equipment more precisely, a contrast agent is injected into a subject to obtain an MRI image. The contrast between tissues on the MRI image is a phenomenon that occurs because the relaxation actions in which the nuclear spins of water molecules to return to the equilibrium state in the different tissues are different from each other. The contrast agent uses a paramagnetic or superparamagnetic material to affect the relaxation action to enhance the difference in relaxation between tissues and thus induce change in the MRI signal to make the contrast between the tissues clearer.

Currently, the most commonly used contrast agent in clinical practice is a contrast agent based on gadolinium (Gd) chelate. Currently, Gd-DTPA (Magnevist®), Gd-DOTA (Dotaram®), Gd(DTPA-BMA) (Omniscan®), Gd(DO3A-HP) (ProHance®), Gd(BOPTA) (MultiHance®), etc. are being used. However, most of the commercially available contrast agents are non-specific contrast agents distributed in the extracellular fluid (ECF). Only a liver-specific contrast agent is used as a specific contrast agent. Recent research is related to the development of a contrast agent that has a specific target or that may exhibit signal enhancement due to physiological activity (pH change, enzyme activity). Currently, sufficient results about MRI contrast agents specific to degenerative brain diseases have not been obtained.

SUMMARY OF THE INVENTION

One purpose of the present disclosure is to provide a gadolinium-based compound that may be used as an MRI contrast material and, in particular, has specificity to degenerative brain disease.

Another purpose of the present disclosure is to provide an MRI contrast agent containing the compound.

Another purpose of the present disclosure is to provide a method for preparation of the compound.

According to the present disclosure, there is provided a gadolinium-based compound represented by a following Chemical Formula 1:

Chemical Formula 1

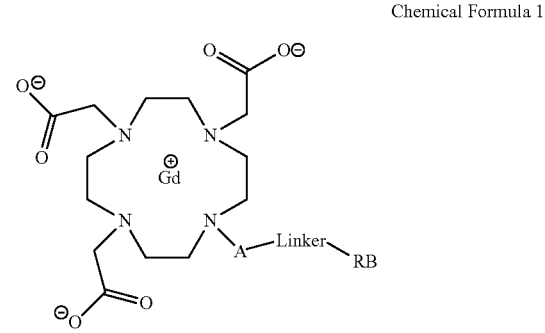

In the above Chemical Formula 1,
A represents *—$(CH_2)_n$-$A^1$-*,
n represents any integer from 0 to 5, $A^1$ represents *—COO—*, *—CO—*, *—$NR^1$—*, *—$CH_2$—*, *—CONH—*, or *—O—*, Linker represents *-$L^1$-NHCO-$L^2$-*, *-$L^1$-O—$R^2$—O-$L^2$-*, *-$L^1$-$CH_2$-$L^2$-*, *-$L^1$-$NR^3$-$L^2$-*, or *-$L^1$-COO-$L^2$-*, each of $L^1$ and $L^2$ independently represents linear or branched (C1-C30)alkyl, each of $R^1$ and $R^3$ independently represents hydrogen or linear or branched (C1-C10)alkyl, $R^2$ represents linear or branched (C1-C20)alkyl, RB represents a following Chemical Formula 2:

Chemical Formula 2

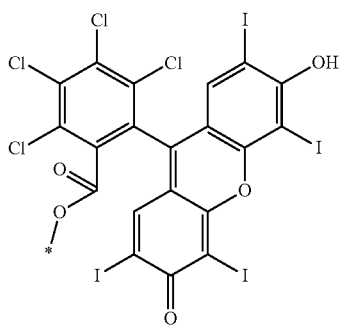

* indicates a connection site.

Further, according to the present disclosure, an MRI contrast agent containing the gadolinium-based compound represented by the Chemical Formula 1 is provided.

Further, according to the present disclosure, there is provided a method for preparing the gadolinium-based compound represented by the Chemical Formula 1, the method comprising following steps:

(a) reacting a salt of Rose Bengal with halogen-substituted alkanoic acid to obtain a compound represented by a following Chemical Formula 1-1, Chemical Formula 1-1

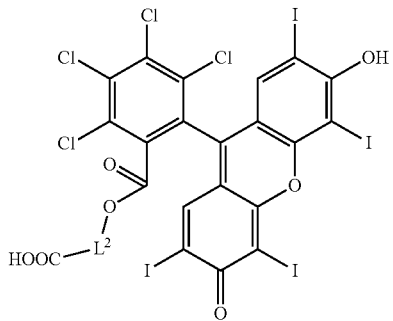

wherein in the Chemical Formula 1-1, $L^2$ is the same as previously defined in the Chemical Formula 1;

(b) reacting the compound of the Chemical Formula 1-1 with a compound represented by a following Chemical Formula 1-2 to obtain a compound represented by a following Chemical Formula 1-3, Chemical Formula 1-2

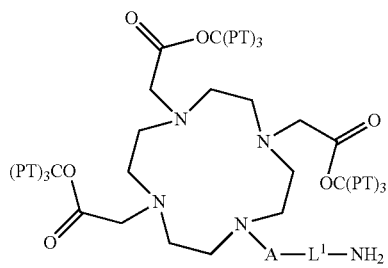

[Chemical Formula 1-3]

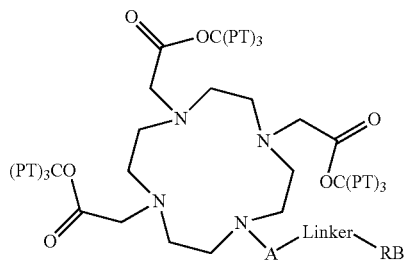

wherein in the Chemical Formulas 1-2 and 1-3,

PT represents a protecting group, each of $L^1$, A, Linker, and RB is as previously defined in the Chemical Formula 1;

(c) removing the protecting group PT from the compound of the Chemical Formula 1-3; and (d) reacting a compound obtained in the step (c) with gadolinium hydrate to obtain a compound of the Chemical Formula 1.

The novel gadolinium-based compound according to the present disclosure not only has sufficient self-relaxation properties to be used as an MRI contrast material, but also binds to VGLUT, especially VGLUT1, so that the compound has an MRI contrast enhancing effect in the presence of VGLUT, and thus may be used for diagnosis of diseases related to VGLUT, specifically, the degenerative brain disease.

DETAILED DESCRIPTION OF THE INVENTION

Figure 1:
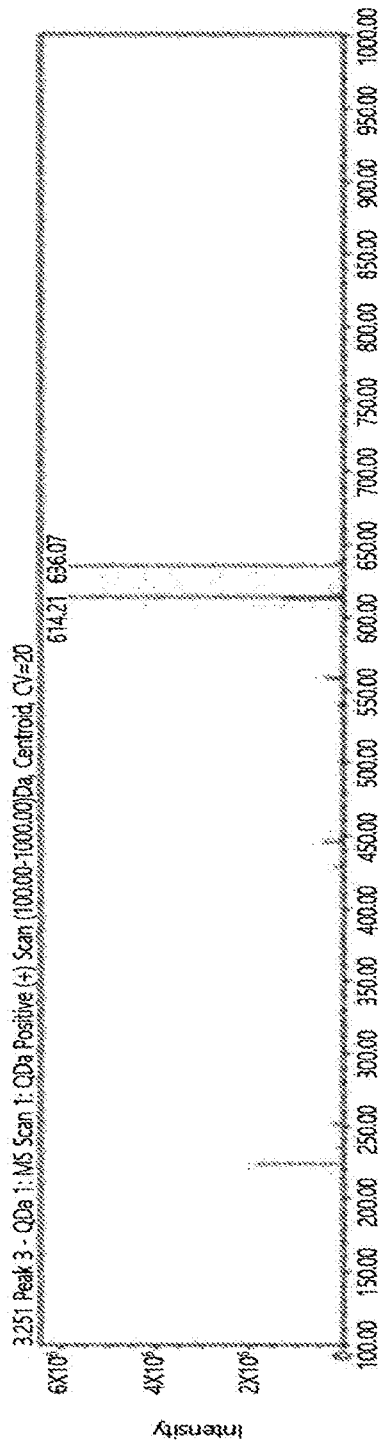
FIG. 1 is an LC-MS spectrum of a compound 1 prepared in a preparation example of a compound according to the present disclosure.

The terminology used herein is for the purpose of describing particular embodiments only and is not intended to be limiting of the present disclosure. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A gadolinium-based compound according to the present disclosure may be represented by a following Chemical Formula 1:

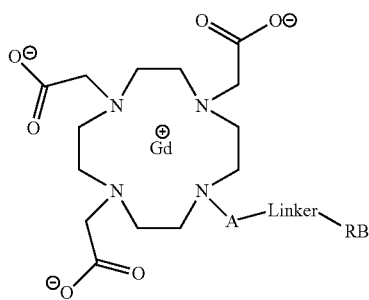

Chemical Formula 1

In the above Chemical Formula 1,

A represents *—$(CH_2)_n$-$A^1$-*, n represents any integer from 0 to 5, $A^1$ represents *—COO—*, *—CO—*, *—$NR^1$—*, *—$CH_2$—*, *—CONH—*, or *—O—*, Linker represents *-$L^1$-NHCO-$L^2$-*, *-$L^1$-O—$R^2$—O-$L^2$-*, *-$L^1$-$CH_2$-$L^2$-*, *-$L^1$-$NR^3$-$L^2$-*, or *-$L^1$-COO-$L^2$-*, each of $L^1$ and $L^2$ independently represents linear or branched (C1-C30)alkyl, each of $R^1$ and $R^3$ independently represents hydrogen or linear or branched (C1-C10)alkyl, $R^2$ represents linear or branched (C1-C20)alkyl, RB represents a following Chemical Formula 2:

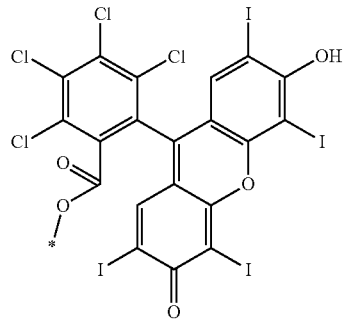

Chemical Formula 2

* indicates a connection site.

According to one embodiment of the present disclosure, in the Chemical Formula 1, n may represent any integer from 1 to 5, and $A^1$ may represent *—CONH—*.

According to another embodiment of the present disclosure, $L^1$ may represent linear or branched (C1-C10)alkyl, and $L^2$ may represent linear or branched (C2-C20)alkyl.

In the gadolinium-based compound of the Chemical Formula 1, gadolinium may be coordinated with at least one water molecule. For example, in the gadolinium-based compound of the Chemical Formula 1, gadolinium may coordinate with one or two water molecules.

In the gadolinium-based compound of the Chemical Formula 1 of the present disclosure, when $A^1$ is *—COO—*, *—CO—*, or *—CONH—*, an oxygen atom may form a coordination bond with gadolinium.

The Chemical Formula 2 of the present disclosure is a portion derived from Rose Bengal (4,5,6,7-tetrachloro-2',4',5',7'-tetraiodofluorescein). The Rose Bengal is generally used as a dye, and in particular, it has been used as an eye drop for staining cells of the conjunctiva and cornea to identify damage thereto. Use of Rose Bengal for an MRI contrast agent with a VGLUT targeting function has not been considered until now.

The gadolinium-based compound of the Chemical Formula 1 of the present disclosure may specifically bind to mammalian vesicular glutamate transporter (VGLUT), as shown in Examples to be described later.

Further, the compound according to the present disclosure is water-soluble and coordinates with at least one or more water molecules and thus has self-relaxation properties. Thus, the compound increases the relaxation of at least one or more water molecules and hydrogen atoms in the human body to improve the image contrast, and thus may be used as an MRI contrast material. The compound according to the present disclosure may exhibit magnetic relaxivity of 5 $mM^{-1}$ $s^{-1}$ or greater, for example, in 3T magnetic resonance imaging.

Accordingly, according to the present disclosure, an MRI contrast agent containing a gadolinium-based compound represented by the Chemical Formula 1 is provided. Further, since the compound according to the present disclosure is capable of binding to VGLUT, the MRI contrast agent according to the present disclosure may be used to diagnose a disease associated with VGLUT, more specifically, degenerative brain diseases such as Parkinson's disease, vascular dementia, Alzheimer's disease. Accordingly, according to one embodiment of the present disclosure, a specific MRI contrast agent for diagnosing degenerative brain disease containing the compound of the Chemical Formula 1 may be provided. Moreover, as described above, according to a recent study, glutamate is overexpressed in the early onset of Alzheimer's disease, and the concentration of glutamate decreases due to nerve cell damage as the disease progresses. Therefore, an MRI contrast agent containing the compound according to the present disclosure targeting the VGLUT may act as a specific MRI contrast agent for the diagnosis of Alzheimer's disease, especially for early diagnosis thereof.

The gadolinium-based compound of the Chemical Formula 1 of the present disclosure may be prepared by a method including following steps:

(a) reacting a salt of Rose Bengal with a halogen-substituted alkanoic acid to obtain the compound of the Chemical Formula 1-1;

(b) reacting the compound of the Chemical Formula 1-1 with the compound of the Chemical Formula 1-2 to obtain the compound of the Chemical Formula 1-3;

(c) removing the protecting group (PT) from the compound of the Chemical Formula 1-3; and (d) reacting a compound obtained in the step (c) with gadolinium hydrate to obtain the compound of the Chemical Formula 1.

According to one embodiment of the present disclosure, in the step (a), the salt of Rose Bengal is an alkali metal salt of Rose Bengal, for example, a sodium salt of Rose Bengal. The halogen-substituted alkanoic acid may be an alkanoic acid derived from a linear or branched (C1-C30)alkane and substituted by one halogen, wherein the halogen is chlorine, fluorine, bromine, or iodine.

In the Chemical Formulas 1-1 and 1-3, PT represents a protecting group, and may be a protecting group commonly used for protecting the —COOH group, for example, methyl, benzyl, tert-butyl, or the like.

Hereinafter, for a detailed understanding of the present disclosure, the compound according to the present disclosure, the method for preparing the same, and characteristics of the MRI contrast agent containing the same will be described based on a representative compound according to the present disclosure.

1. Preparation Example of Compound According to the Present Disclosure

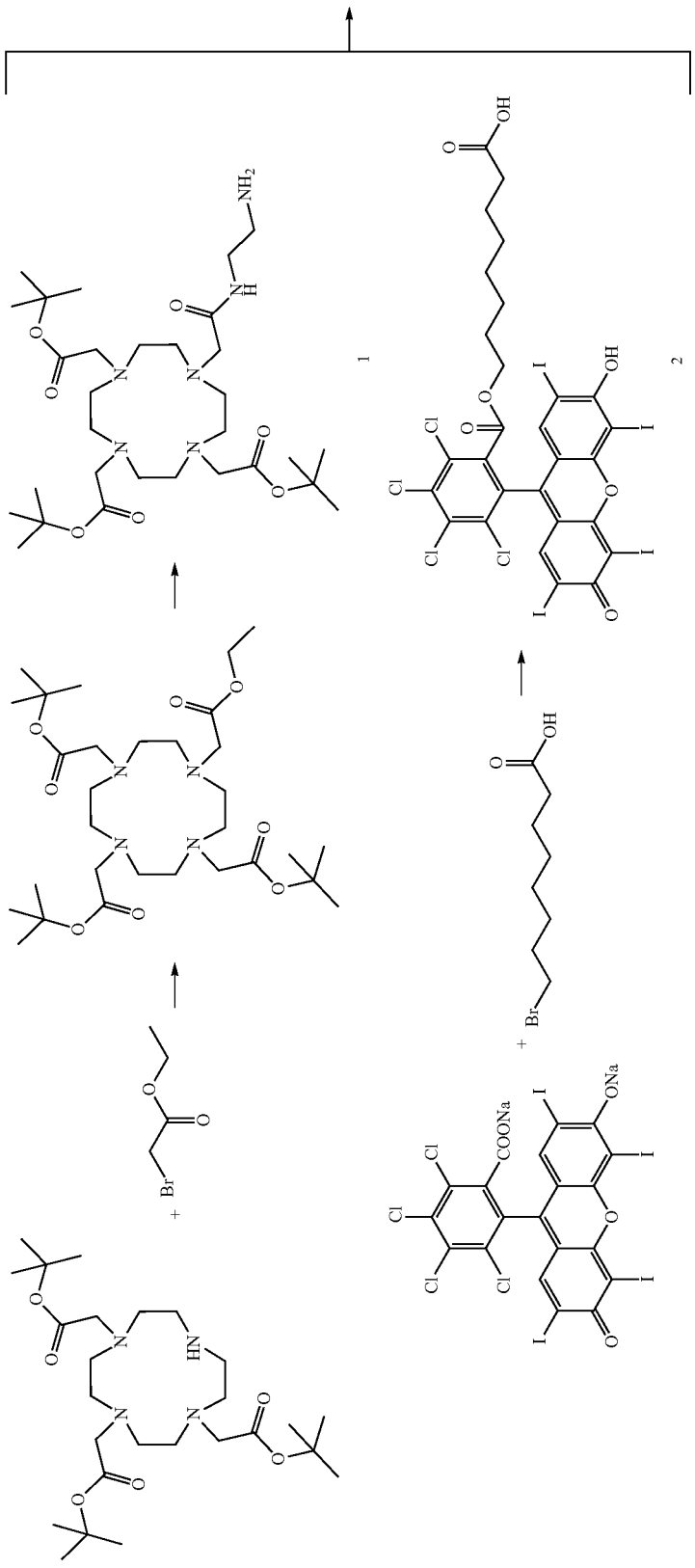

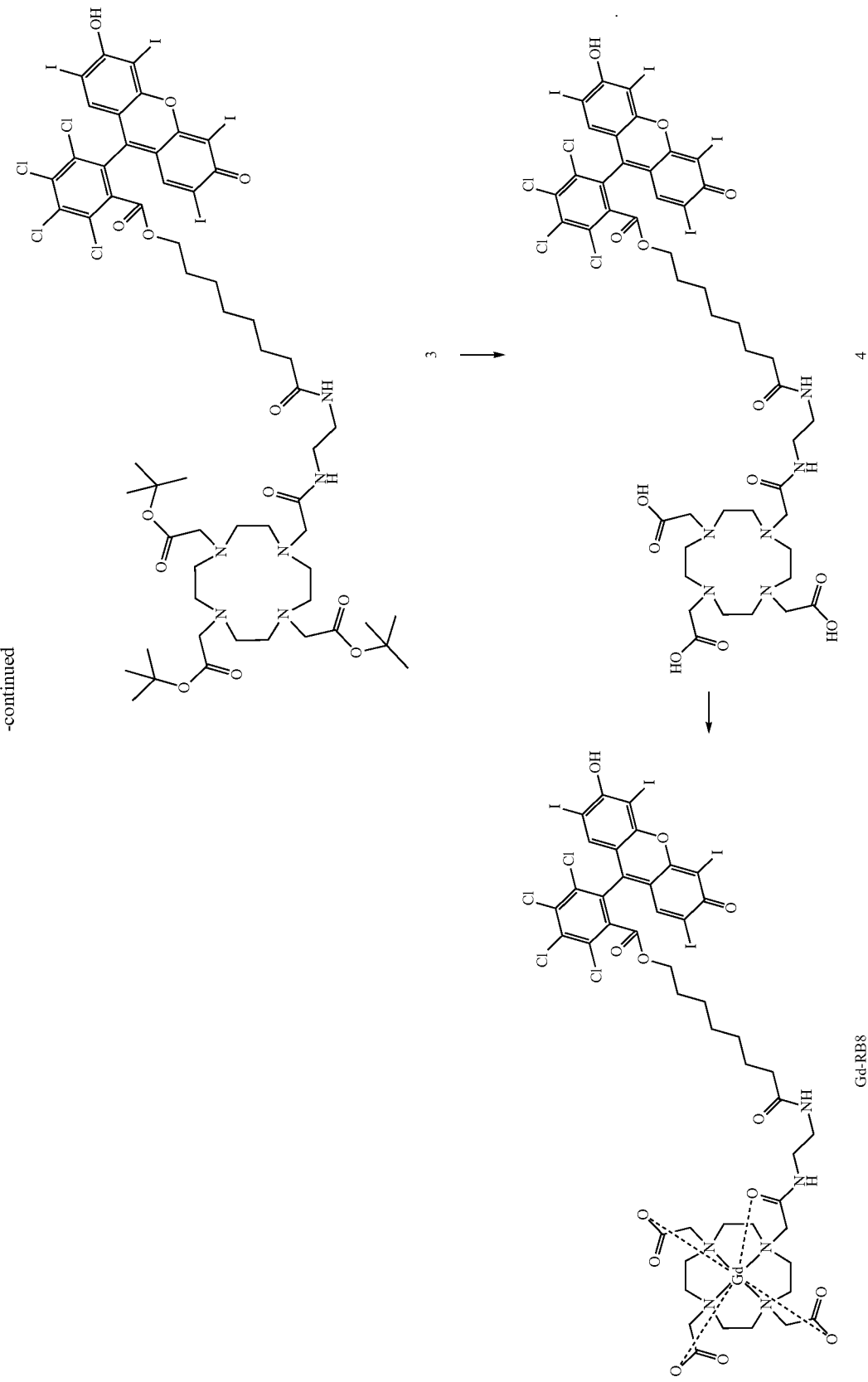

1) Preparation of tri-tert-butyl 2,2',2"-(10-(2-((2-aminoethyl)amino)-2-oxoethyl)-1,4,7,10-tetraazacyclo-dodecane-1,4,7,10-triyl)triacetate (compound 1)

1,4,7-tris(tert-butoxycarbonylmethyl)-1,4,7,10-tetraazacyclododecane HBr (2.53 g, 4.25 mmol) was dissolved in acetonitrile (ACN) (50 mL). Then, KHCO$_3$ (1.29 g, 12.9 mmol) and ethyl bromoacetate (518 μL, 4.68 mmol) were sequentially added to the solution, and the mixture was heated to reflux at 60° C. for 24 hours. After the reaction, the salt was filtered off, the solvent was dried under reduced pressure, the residue was dissolved in methanol (15 mL), ethylenediamine (10 mL) was added thereto, and the mixture was stirred at room temperature for 4 days. Whether the reaction was completed was identified using thin layer chromatography (TLC). Then, the solvent was dried under reduced pressure, and a light yellow foamy substance (compound 1) was obtained via column chromatography (mobile phase: DCM/MeOH=97/3). The LC-MS spectrum of the compound 1 is shown in FIG. 1. Yield: 2.02 g (77%), LC-MS: m/z: 614 [M+H]$^+$ 2) Synthesis of 8-((2,3,4,5-tetrachloro-6-(6-hydroxy-2,4,5,7-tetraiodo-3-oxo-3H-xanthen-9-yl)benzoyl)oxy)octanoic Acid (Compound 2)

Figure 2:
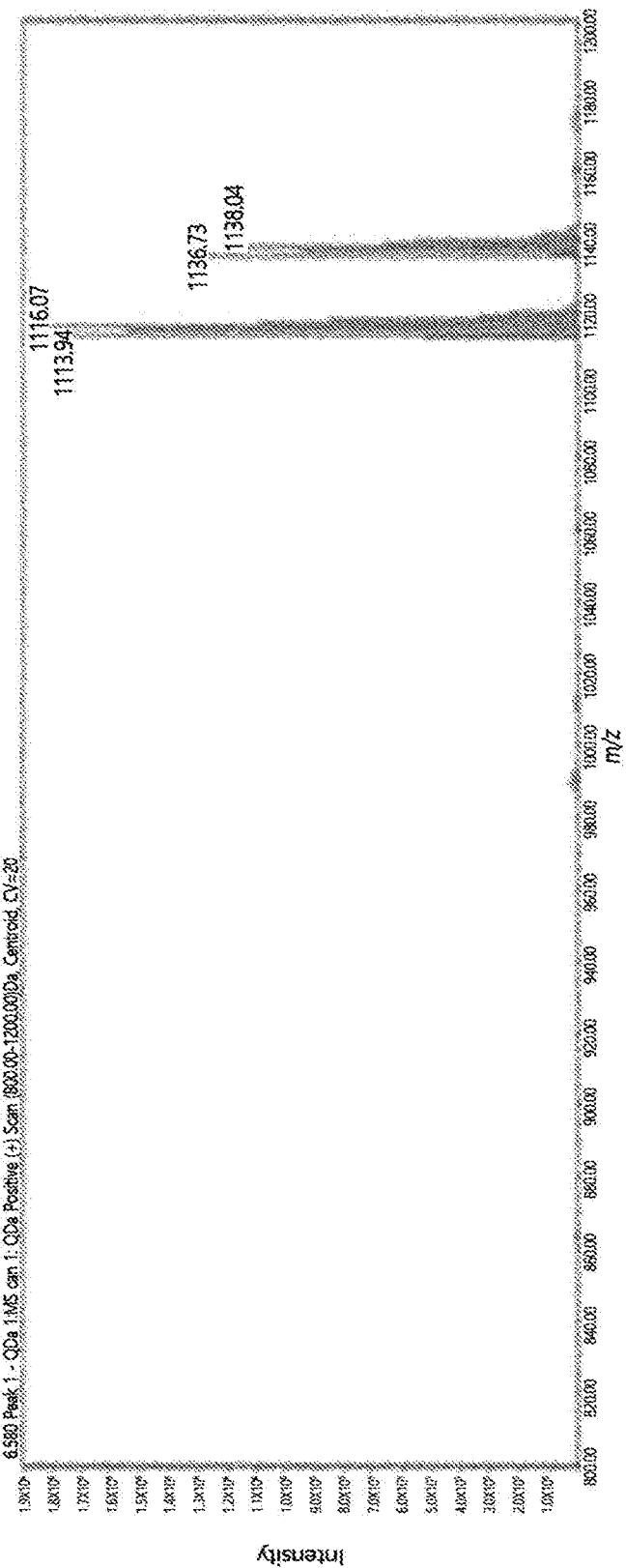
FIG. 2 is an LC-MS spectrum of a compound 2 prepared in a preparation example of a compound according to the present disclosure.

Sodium salt of Rose Bengal (0.5 g, 0.49 mmol), and 8-bromooctanoic acid (0.68 g, 3.05 mmol) was dissolved in dimethylformamide (DMF) (10 mL), and then the mixture was heated to reflux at 80° C. for 24 hours. After the reaction, the solvent was dried under reduced pressure, the product was dissolved in methanol (MeOH) (1 mL), and an excess of diethyl ether (100 mL) was slowly added thereto to obtain a precipitate. The precipitate was washed 3 times with diethyl ether and dried under reduced pressure to obtain a powdery purple solid (compound 2). The LC-MS spectrum of the obtained compound 2 is shown in FIG. 2. Yield: 0.51 g (90%), LC-MS: m/z: 1113.60 [M+H]$^+$ 3) Synthesis of tri-tert-butyl 2,2',2"-(10-(2-oxo-2-((2-(8-((2,3,4,5-tetrachloro-6-(6-) hydroxy-2,4,5,7-tetraiodo-3-oxo-3H-xanthen-9-yl)benzoyl)oxy)octanamido)ethyl)amino)ethyl)-1,4,7,10-tetraazacyclododecane-1,4,7-tri)triacetate (Compound 3)

Figure 3A:
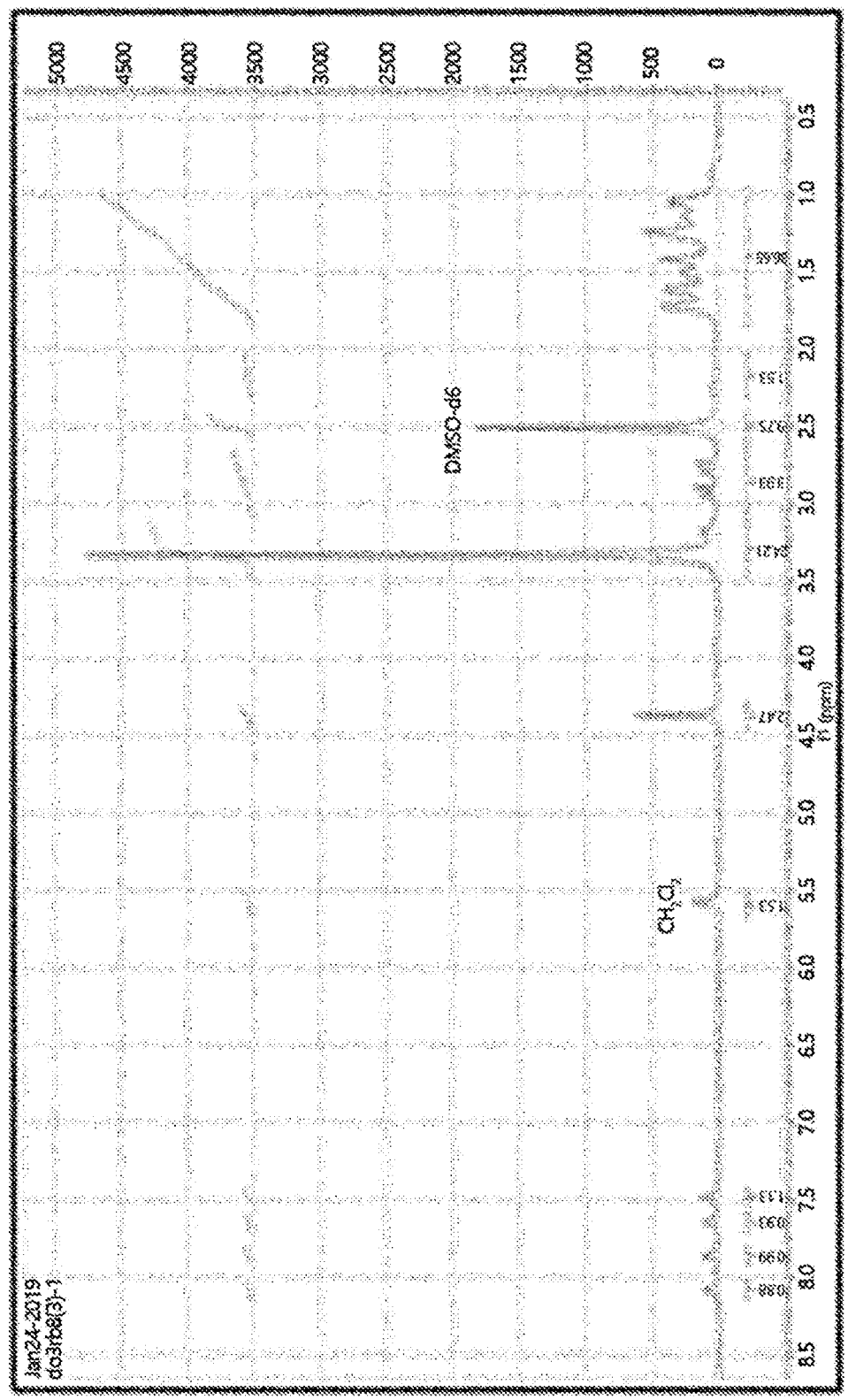
FIG. 3A is NMR spectrum of a compound 3 prepared in a preparation example of a compound according to the present disclosure.
Figure 3B:
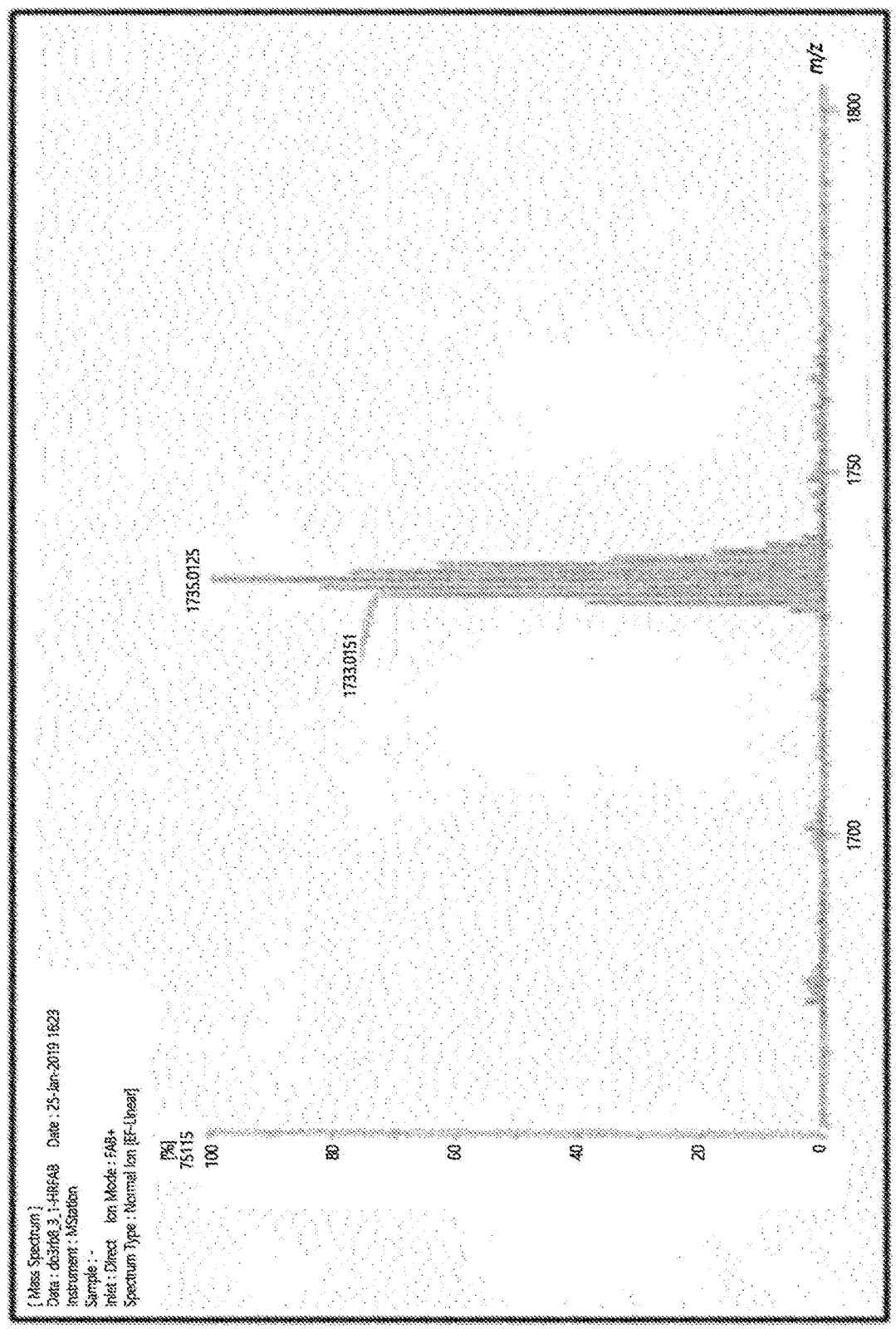
FIG. 3B is HR-FAB-MS spectrum of the compound 3.

The obtained compound 2 (0.25 g, 0.22 mmol) was dissolved in dichloromethane (DCM) (20 mL), and N,N'-dicyclohexylcarbodiimide (0.07 g, 0.32 mmol) was added thereto. The mixture was stirred at room temperature for 15 minutes. Then, 1-hydroxybenzotriazole (0.04 g, 0.32 mmol) was added to the solution. The mixture was stirred at room temperature for further 10 minutes, and then the obtained compound 1 (0.14 g, 0.22 mmol) was added thereto. The mixture was stirred for 18 hours at room temperature. After the reaction, the resulting precipitate was removed via filtration, and the solvent was filtered under reduced pressure, and the residue was dissolved in ethyl acetate (EA) (20 mL), and the obtained solution was washed three times with an aqueous KHCO$_3$ solution. MgSO$_4$ was added to the organic layer for dehydration. The solvent was removed and the resultant was purified using column chromatography (mobile phase: DCM/MeOH=98:2) to obtain a dark red solid (compound 3). The NMR spectrum and HR-FAB-MS spectrum of the obtained compound 3 are shown in FIG. 3A and FIG. 3B, respectively. Yield: 0.1 g (26%)

$^1$H NMR (500 MHz, DMSO-d$_6$): δ=1.04 1.72 (m, 37H, tBu, CH$_2$), 2.15 (m, 2H, CH$_2$), 2.64-2.95 (m, 4H, CH$_2$), 3.18 3.33 (m, 24H, CH$_2$, CH$_2$ in the cyclen ring), 4.37 (s, CH$_2$), 7.49 (s, 1H, rose bengal), 7.65 (s, 1H, rose bengal), 7.85 (d, 1H, NH), 8.08 (d, 1H, NH)

HR-FAB-MS (m/z): calculated for C$_{58}$H$_{74}$C$_{14}$N$_6$O$_{13}$NaI$_4$=1733.0145 [M+Na]$^+$; found, 1733.0151 [M+Na]$^+$.

4) Synthesis of 2,2',2"-(10-(2-oxo-2-((2-(8-((2,3,4,5-tetrachloro-6-(6-hydroxy-2,4,5,7-tetraiodo-3-oxo-3H-xanthen-9-yl)benzoyl)oxy)octanamido)ethyl)amino)ethyl)-1,4,7,10-tetraazacyclododecane-1,4,7-triyl)triacetic acid (compound 4)

Figure 4:
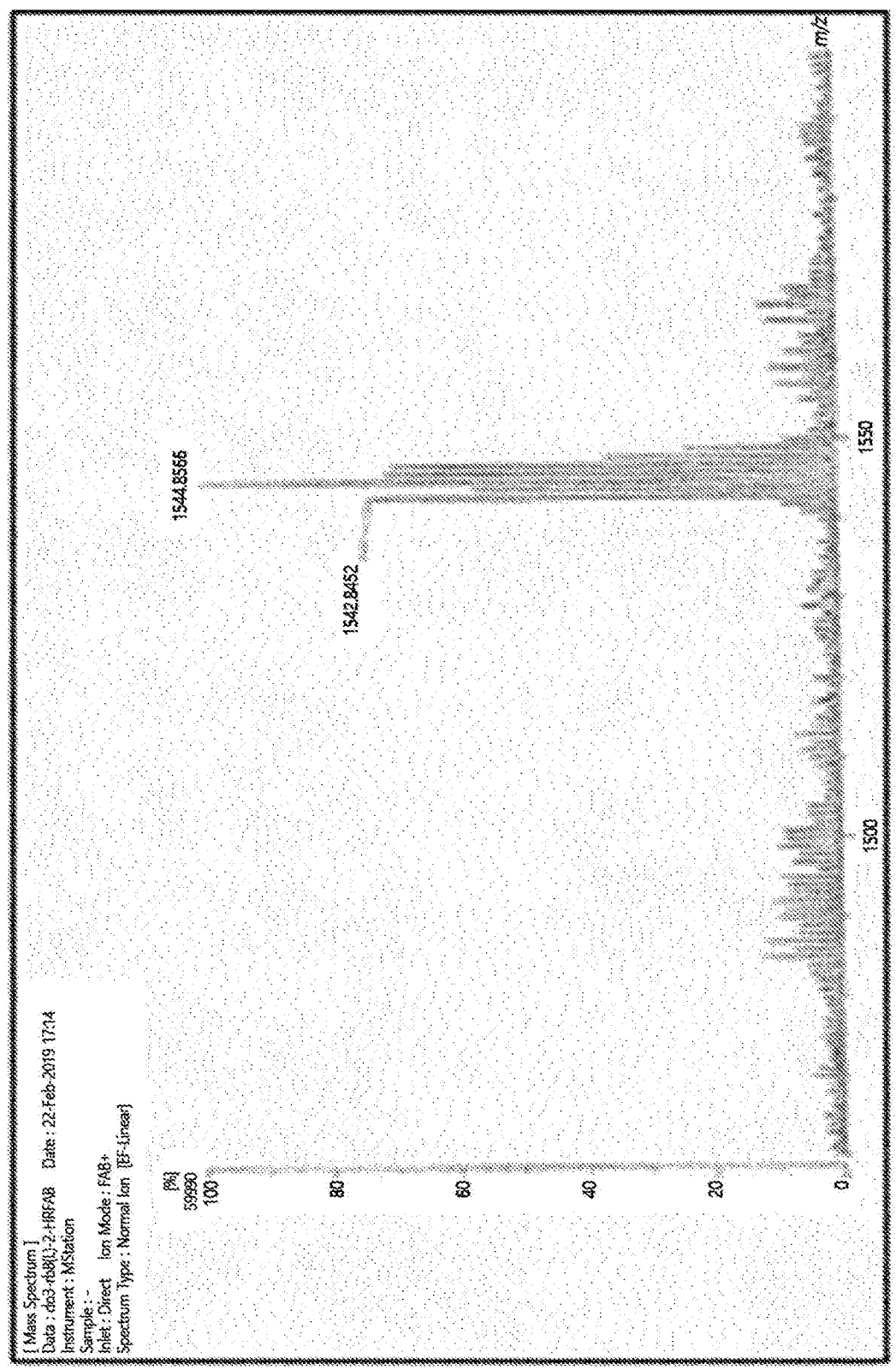
FIG. 4 is HR-FAB-MS spectrum of a compound 4 prepared in a preparation example of a compound according to the present disclosure.

The obtained compound 3 (0.36 g, 0.21 mmol) was dissolved in tetrafluoroacetic acid (TFA) (15 mL), followed by stirring at room temperature for 24 hours. The completion of the reaction was determined using TLC. 20 mL of CHCl$_3$ and 20 mL of MeOH were added thereto, and drying under reduced pressure was repeated three times to remove TFA. After removal of the solvent, the resultant was dried. The obtained crude of the red oil was dissolved in DMF (3 mL), and acetone (130 mL) was added thereto, and a precipitate was produced. The resulting precipitate was obtained via centrifugation, washed three more times with acetone, and the resultant was identified using mass spectrometry, and the resulting compound 4 was used in a next reaction. The HR-FAB-MS spectrum of the obtained compound 4 is shown in FIG. 4.

HR-FAB-MS (m/z): calculated for C$_{58}$H$_{74}$C$_{14}$N$_6$O$_{13}$NaI$_4$=1542.8447 [M+Na]$^+$; found, 1542.8452 [M+Na]$^+$.

5) Synthesis of Compound Gd-RB (Compound According to the Present Disclosure)

Figure 5A:
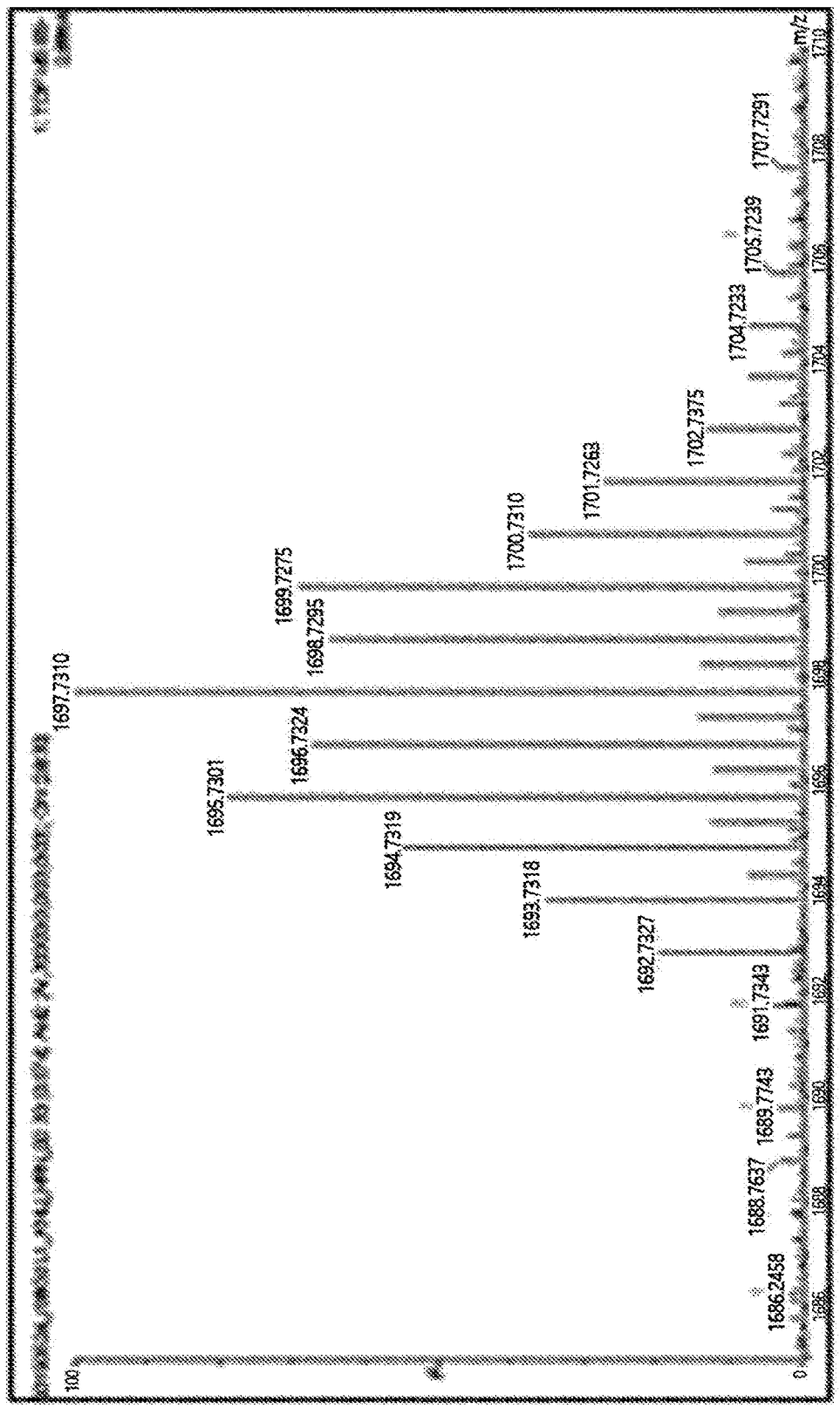
FIG. 5A is HR-ESI-MS spectrum of a compound Gd-RB prepared in a preparation example of a compound according to the present disclosure.
Figure 5B:
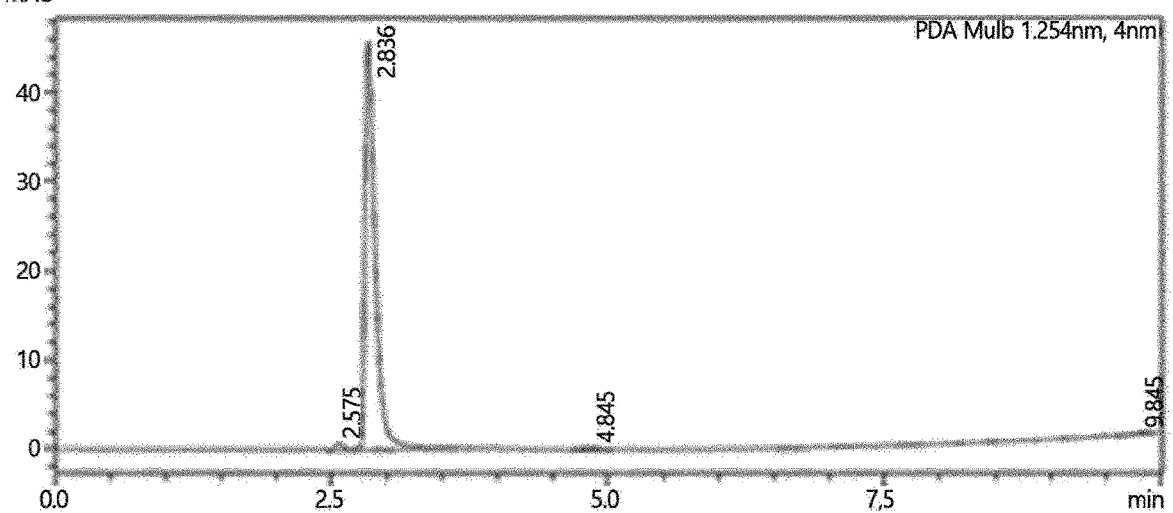
FIG. 5B is HPLC chromatogram of the compound Gd-RB.

The compound 4 (0.66 g, 0.043 mmol) was dissolved in DMF (10 mL), and Gd(OAc)$_3$·4H$_2$O (0.16 g, 0.47 mmol) was added thereto. After heating the mixture at 80° C. for 12 hours, a progress of the reaction was identified using TLC. After completion of the reaction, the solvent was removed via filtration under reduced pressure, and the resulting product was then purified using a flash column (mobile phase: water/MeOH=28/72) to obtain a dark red solid (compound Gd-RB). The HR-ESI-MS spectrum and the HPLC chromatogram of the obtained compound Gd-RB are shown in FIG. 5A and FIG. 5B, respectively. Yield: 0.2 g (18%)

HR-ESI-MS (m/z): calculated for C$_{46}$H$_{46}$N$_6$O$_{13}$Cl$_4$I$_4$Gd=1695.7297 [M−H]$^+$; found, 1695.7301 [M−H]$^+$, purity analysis using analytical HPLC: 97.18%.

Hereinafter, the representative compound according to the present disclosure as prepared above may be used as an MRI contrast material, and at the same time, characteristic evaluation thereof was performed to determine whether or not the compound has a targeting ability to VGLUT1 (vesicular glutamate transporter 1) as one of the glutamate transporters.

2. Method and Result of Characterization of Compound According to the Present Disclosure 1) Evaluation of Relaxivity The compound Gd-RB obtained in the above preparation example was dissolved in dimethyl sulfoxide (DMSO)/water (5:5) at a concentration of 10 mM, and then diluted with water to obtain samples having five concentration levels between 0 and 1 mM. Three sample sets were prepared, and were used to obtain MRI images. The relaxivity thereof was measured using MRI of each of 3.0 T and 9.4 T, and the measurement of the T1 value was performed using the inversion recovery method. Specifically, at 3.0 T, more than 10 different inversion times (TI) in a range from 50 to 1800 msec were used in the FSE-IR (fast spin echo-inversion recovery) sequence. At 9.4 T, more than 10 different inversion times (TI) in a range from 85 to 7000 msec were used in the IR-RARE (inversion recovery-rapid imaging with refocused echoes) sequence. T2 measurement was performed using different echo time (TE) values while applying a CPMG (Carr-Purcell-Meiboon-Gill) pulse sequence to multiple spin-echo measurements. Specifically, the T2 was measured using 10 or more different TEs in a range of 8.5 to 135 msec in the T2 MAP sequence at 3.0 T. The T2 was measured using 10 or more different TEs in a range of 10 to 700 msec in the MSME (multi slice multi echo) sequence at 9.4 T. The T1 and T2 relaxation times were obtained from the non-linear least-square of mean pixel values for multiple spin-echo measurements of each echo time. Then, the relaxivity (R1 and R2) was calculated as the inverse of the relaxation time per mM. Finally, image-work was done with the calculated relaxation times (T1 and T2) and relaxivity (R1 and R2) to create a relaxation time map and a relaxivity map, respectively, and the relaxivity (r1 and r2) were obtained. The results are shown in the following [Table 1].

TABLE 1

|  | $r_1$ (mM$^{-1}$s$^{-1}$) | $r_2$ (mM$^{-1}$s$^{-1}$) |
| --- | --- | --- |
| 3 T | 5.42 | 9.14 |
| 9.4 T | 2.78 | 14.44 |

2) In Vitro Binding Test Via Primary Culture
2)-(1). Experimental Method
① Primary Culture of Rat Brain Neurons Sprague Dawley rats at 18 to 9 days of pregnancy were purchased from Daehan Biolink. After stabilizing the pregnant mice, respiratory anesthesia was performed using isoflurane, and the fetus was separated from the mother. The fetal brain was separated therefrom, the membrane was removed therefrom, and only the hippocampus and the cerebral cortex were selected and isolated, cut into small pieces, put in HBSS buffer and washed 4 times (centrifugation 1000 rpm, 3 minutes). After the last washing, HBSS was removed, and HBSS buffer containing trypsin was added thereto (cell volume: trypsin HBSS=1:1) and reaction occurred in a constant temperature water bath (37° C.) for 5 minutes. HBSS buffer containing 10% FBS was added thereto ((cell volume+trypsin HBSS): 10% FBS HBSS=1:1) to stop the enzyme reaction of trypsin, and the resulting product passed through 4 layers of lens paper and thus was formed into single cells. The cells were washed 4 times via centrifugation with HBSS buffer, and only the cells separated into the single cells were obtained.

② Phantom Study

The obtained cells were suspended in neurobasal media containing 1×N2 supplement, 1×B27, 4 mM L-glutamine, and 1% antibiotics at 7×10$^6$ cells per E-tube. Gd-RB or Gadovist was added to each E-tube at a concentration of 0, 50, 100, 200, 400 µM, and reacted at 37° C. in a shaker for 24 hours. After 24 hours, centrifugation was performed at 4000 rpm and 4° C. for 5 minutes to remove the supernatant. 1 mL of PBS was added thereto and the cells were released via pipetting. Centrifugation was repeated 3 times under the same conditions to remove substances which were not coupled to the cells. RIPA solution (150 uL) was added thereto. The cells were disrupted via vortexing at 4° C. for 1 hour at 15 minute intervals. 350 uL of PBS was added to the disrupted cells to produce a total sample of 500 uL, and MR imaging was performed thereon. The MRI was taken at 3T and the parameters are as follows in a fast spin echo sequence. 256*256 matrix size; number of acquisitions (NEX)=4; phase field of view (FOV)=0.8; repetition time (TR)=400 ms; echo time (TE)=13.2 ms; echo train length (ETL)=3; field of view (FOV)=12 mm; slice thickness=2.5 mm; spacing=0. MRI intensity was analyzed using ImageJ program.

2)-(2). Experiment Result

Figure 6A:
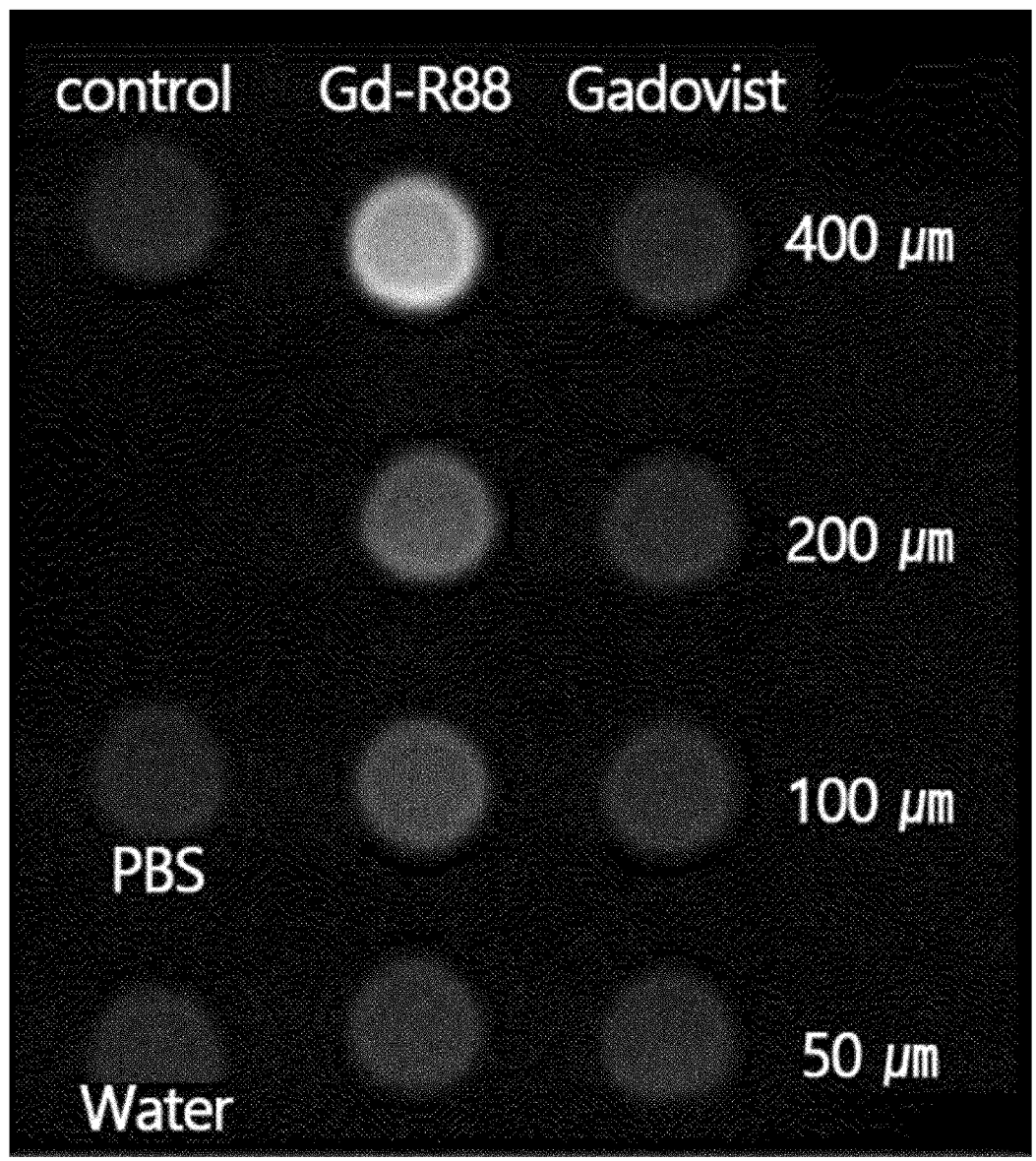
FIG. 6A is an MR phantom image obtained when a control, a compound Gd-RB8 according to the present disclosure, and Gadovist as a commercial contrast agent are used.
Figure 6B:
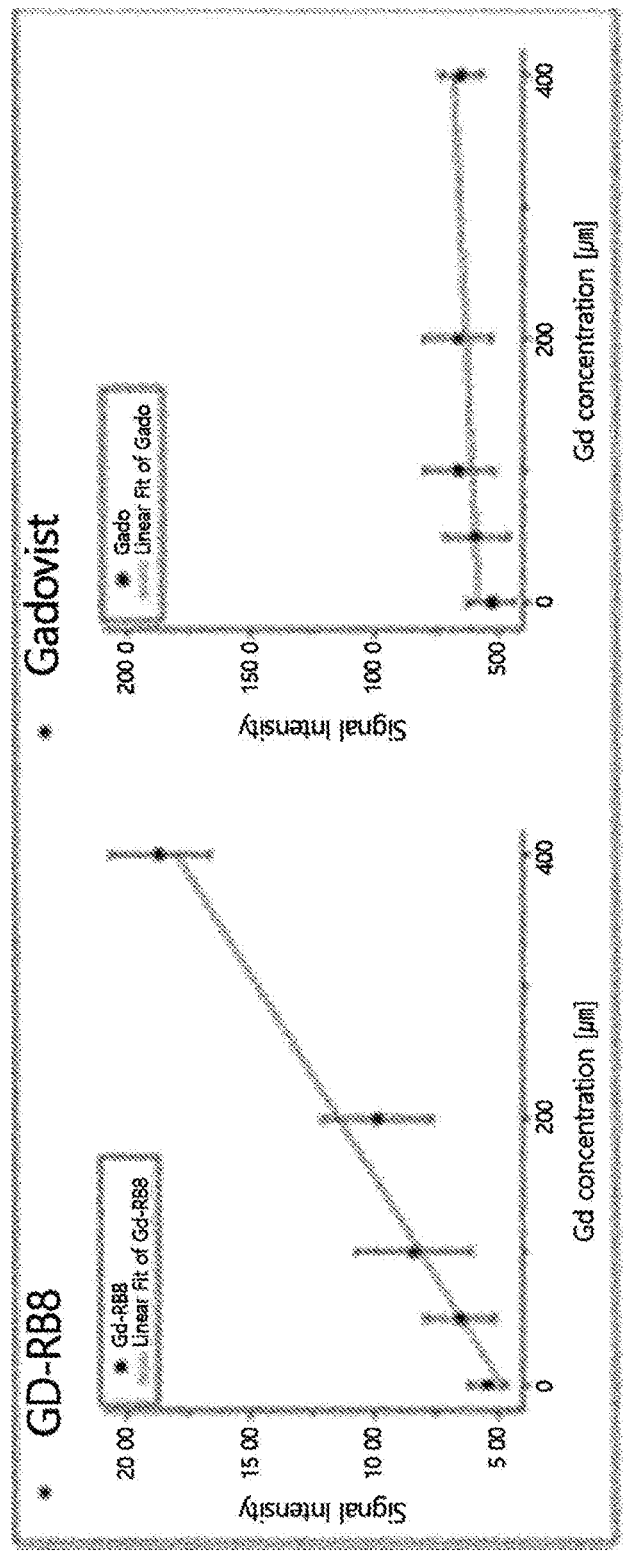
FIG. 6B is a graph showing a phantom signal intensity based on a concentration of each of the compound Gd-RB according to the present disclosure and the Gadovist as a commercial contrast agent.

The MR phantom image performed in 2)-(1) is shown in FIG. 6A, and the change in the phantom signal intensity based on the concentration of each of the compound GD-RB8 according to the present disclosure and the commercial contrast agent Gadovist is shown as a graph in FIG. 6B. In this regard, a control is directed to a sample containing only cells and no other contrast agent. As shown in FIG. 6A and FIG. 6B, when Gadovist was applied to a certain number of cells, there was little difference in brightness based on the Gd concentration. In contrast, it was identified that when the prepared compound Gd-RB according to the present disclosure was applied thereto based on each Gd concentration, the brightness of the phantom increased as the Gd concentration increased. From this fact, it could be identified that the compound Gd-RB binds to VGLUT1 in the presence of VGLUT1, and that the binding amount increases in proportion to the concentration of the compound Gd-RB. The change in signal intensity based on the Gd concentration is expressed as a graph based on a measuring result of the signal intensity in each phantom.

3) In Vitro Binding Test Using Immunofluorescence Staining

3)-(1). Experimental Method

The primary cultured cells were seeded in a Cell Culture Slide 4well (cat. No. 30104, SPL) based on Neurobasal™ Medium (cat. No. 21103049, Gibco) containing 4 mM L-glutamine at 4*10$^5$ per well. After incubation for 24 hours, the cells were cultured in Neurobasal™ Medium that does not contain L-glutamine while the light is blocked. The compound Gd-RB was applied thereto at each of 0, 100, 200, and 400 uM concentration for 10 minutes, and the cells were washed 3 times using the DPBS buffer.

The cells were fixed in 4% paraformaldehyde (PFA) for 15 minutes, washed with TBS buffer 3 times for 5 minutes. Then, blocking was performed using TBS buffer containing 5% normal gout serum (NGS) and 5% bovine serum albumin (BSA) for 1 hour. VGLUT1 Polyclonal Antibody (Cat. No. 48-2400, invitrogen) was diluted with TBS buffer containing 5% NGS and 5% BSA at a ratio of 1:250 and reaction occurred overnight at 4 degrees C. The cells were 3 times washed for 15 minutes with TBS buffer. The secondary antibody, Goat anti-Rabbit Alexa Fluor 488 (Cat. No. A-11008, invitrogen) was diluted with TBS buffer containing 5% NGS and 5% BSA at a ratio of 1:500. The dark reaction was carried out for 1 hour and 30 minutes at 25 degrees C. After washing 3 times for 10 minutes with TBS buffer, mounting was performed with VECTASHIELD® Phardset™ Antifade Mounting Medium with DAPI (Cat. No. H-1500 VECTOR), and images of fluorescently stained cells were obtained using lionphart equipment. A 20× objective lens was used. Regarding a fluorescence intensity, ROI values were analyzed using lionphart software.

Figure 7A:
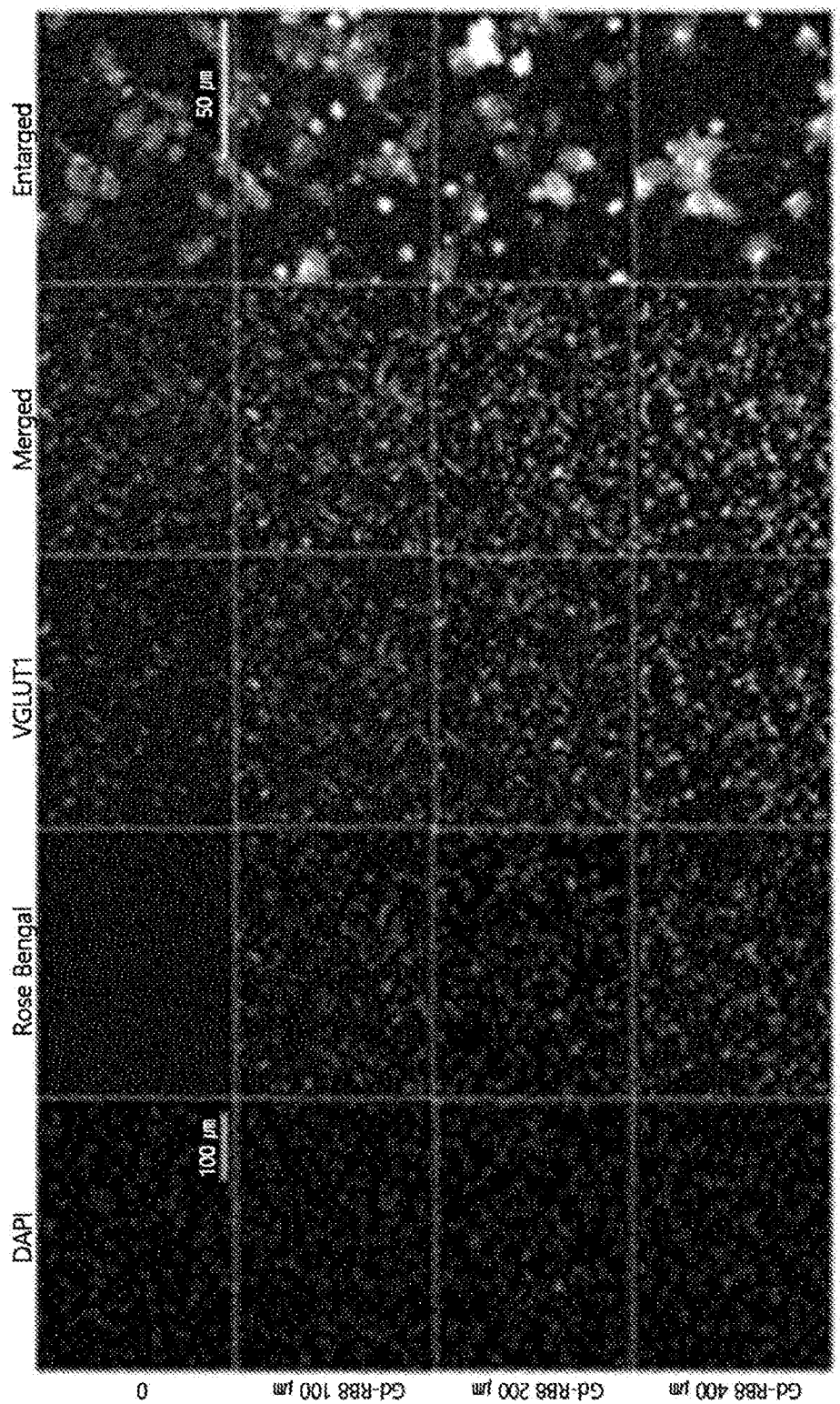
FIG. 7A is a diagram showing a fluorescence image in an in vitro binding test using immunofluorescence staining.
Figure 7B:
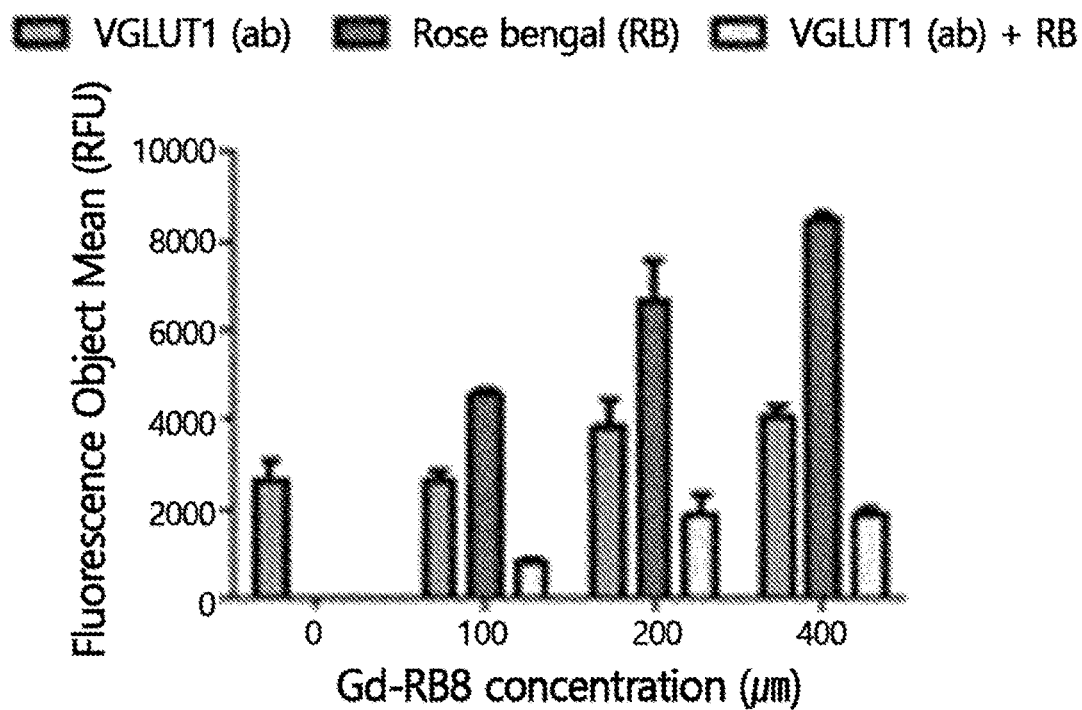
FIG. 7B is a graph showing fluorescence intensity based on a concentration of the compound Gd-RB.

Since the compound Gd-RB may be detected at a wavelength of 595 nm (red) under a fluorescence microscope, an image of VGLUT1 (the drawing shown under the mark "VGLUT1" in FIG. 7A) and an image of Gd-RB (the drawing shown under the mark "Rose Bengal" in FIG. 7A) were merged with each other and a value co-localized (the drawing shown under the mark "Merged" in FIG. 7A) was analyzed (see FIG. 7A and FIG. 7B). FIG. 7A shows a fluorescence image, and FIG. 7B shows a graph of each fluorescence intensity according to the compound Gd-RB concentration.

3)-(2). Experiment Result

Referring to FIG. 7A, it was identified that the fluorescence image of Rose Bengal (shown under the label "Rose Bengal" in FIG. 7A) and the fluorescence image of the antibody against VGLUT1 (shown under the label "VGLUT1" in FIG. 7A) were superimposed with each other (shown under the mark "Merged" in FIG. 7A), the two images overlap each other. From the above result, it may be identified that the compound (Gd-RB) according to the present disclosure targets VGLUT well. Accordingly, it may be identified that the compound according to the present disclosure may be suitably used as the MRI contrast agent targeting the VGLUT.

4) In Vivo Binding Test Using Immunofluorescence Staining

4)-(1). In Vivo MR Imaging

Figure 8A:
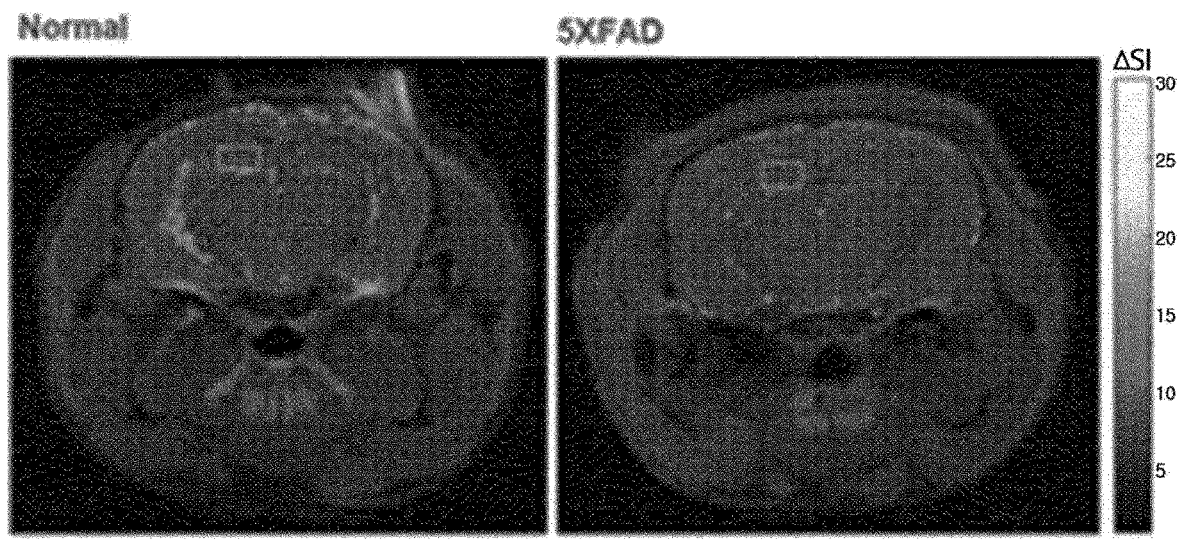
FIG. 8A is a diagram showing a brain MR image obtained via an in vivo animal experiment after "post-pre" processing and then color mapping.

Wild-type C57BL/6 mice were used as a 5×FAD transgenic AD mouse model and control under the approval of the Institutional Animal Care and Committee of the Daegu Gyeongbuk Advanced Medical Industry Promotion Foundation (DGMIF), and all in vivo experiments were performed according to approved protocols. For in vivo MR imaging, 12 months old male 5×FAD mice and C57BL/6 mice were anesthetized with isoflurane. After pre-image acquisition, 50 mM Gd-RB in DMSO was injected into cerebral ventricle (ICV) thereof at a dose of 0.1 mmol/kg and imaging was carried out for 3 hours. The brain MR image obtained via the in vivo animal experiment using a 9.4 T scanner (Bruker, BioSpin, Germany) was subjected to "post-pre" processing and was color-mapped to obtain a diagram (FIG. 8A). Imaging parameters for T1-weighted images are as follows: TR=700 ms; TE=7 ms; 20 mm FOV; 128×128 matrix size; 0.5 mm slice thickness.

4)-(2). Image Analysis

In vivo image subtraction and color mapping were performed using MATLAB software (R2015a, MathWorks Inc., Natick, MA, USA).

The color-mapped images were expressed as signal intensity values using Equation (1).

$$\Delta SI = SI_{post} - SI_{pre} \quad (1)$$

4)-(3). Immunohistochemistry of Postmortem Brain Section

Following acquisition of in vivo MR images, mouse brains were harvested 3 hours after injection. When the tissue was completely frozen in OCT compound (Tissue-Tek, Sakura Finetek, USA), the tissue was sectioned into several partial frozen-sections with a thickness of about 20 μm using a freezing microtome (Leica Biosystems, Wetzlar, Germany). The sections were mounted on microscope glass slides. For immunohistochemical staining, average 6 to 8 sections including the hippocampus per brain were used and analyzed blindly by the investigator. All sections including the hippocampus were collected in DPBS solution containing 0.1% sodium azide and stored at 4° C. Brain sections were blocked with 3% goat serum (Gibco Co., Grand Island, NY, USA) and TBS containing 0.1% Triton X-100 and incubated with primary antibody (anti-VGLUT1) for 2 hours at 25° C. Brain sections were then washed with TBS and were incubated in the presence of an IgG-labeled secondary antibody together with Alexa Fluor (Cell Signaling Technology Inc., Beverly, MA, USA) for 1 hour. The sections were mounted in DAPI solution for 10 min and then observed under a fluorescence microscope (ECLIPSE Ti, Nikon, NY, USA). Images were analyzed using NIS-Elements Basic Research imaging software (version 4.50).

4)-(4). Experiment Result

Figure 8B:
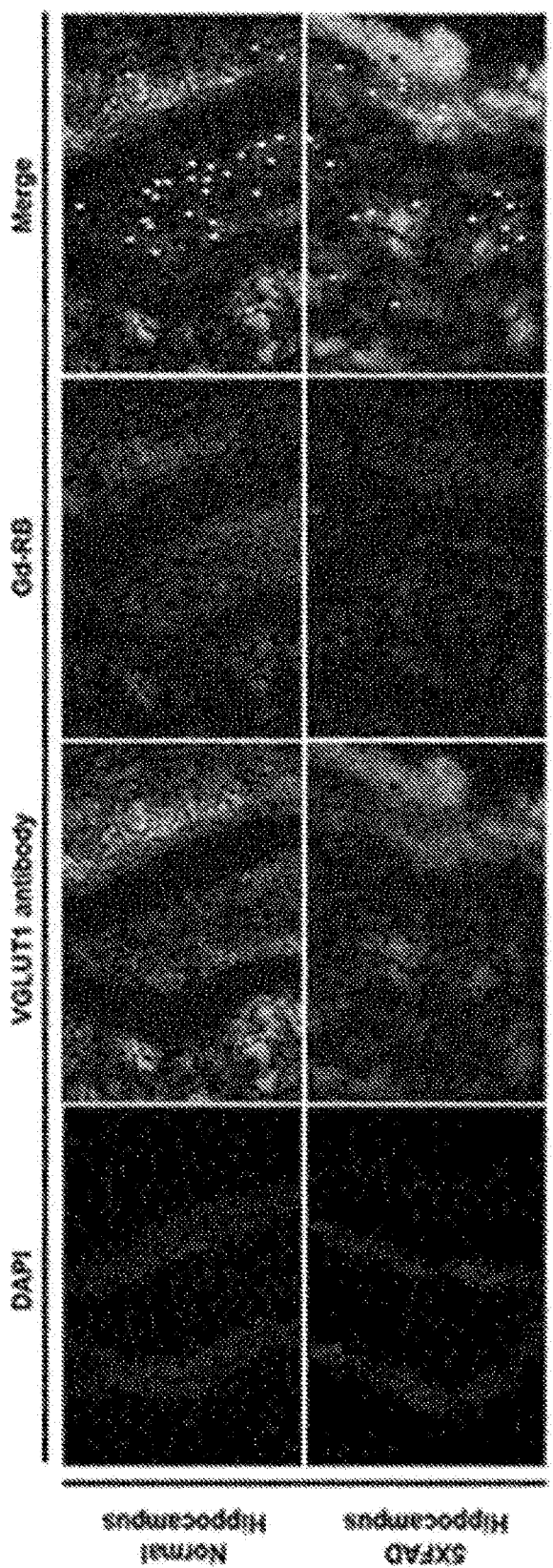
FIG. 8B is an image obtained by immunofluorescence staining of a brain extracted from an animal model after an in vivo binding test.

Gd-RB was injected into cerebral ventricles of 12-months normal mice and 12-month-old late dementia model. The MR image obtained after 2 hours and 30 minutes was obtained. The "post-pre" image was obtained therefrom using the MATLAB program and then was subjected to color mapping. From FIG. 8A, it may be seen that there is a change in signal intensity in more areas in normal mice than in dementia mice. FIG. 8B shows the results of immunofluorescence staining of the brain as extracted 3 hours later (In other words, there is a change in signal intensity in more areas in normal mice; for example, in the drawing shown under the mark "Merge" in FIG. 8B, the area with the difference in intensity is indicated by a white arrow, and the number of the white arrows is larger in the normal mouse). That is, from FIG. 8B, it was identified that based on the results of immunofluorescence staining, the signals of VGLUT1 antibody (shown under the label "VGLUT1 antibody" in FIG. 8B) and Gd-RB (shown under the label "Gd-RB" in FIG. 8B) overlap each other, indicating that Gd-RB targets the VGLUT1 in in vivo experiments.

5) Cell Viability Test

5)-(1). Cell Culture and Cytotoxicity Experiments

Human-derived neuroblastoma cells (SH-SY5Y) were cultured in MEM (Minimum Essential Medium) containing 10% Fetal bovine serum (FBS), 4 mM glutamine, and 1% antibiotics at $1 \times 10^4$ per well of a 96-well plate. After attaching and stabilizing the cells for 24 hours, each of Gd-RB and Gadovist was diluted and applied at a concentration of 0, 50, 75, 100, 150, 200, 400 μM to 100 μl of growth medium per well, and the cells were incubated for 22 hours. Then, 10 μl of CCK-8 (Cell Counting Kit-8, Dojindo Laboratories, Kumamoto, Japan) solution was added to each well, and the cells were further incubated for 2 hours. The absorbance of the cultured plate was measured at 450 nm using a microplate reader.

Calculation of Cell Viability

A: Absorbance value measured in well of control

B: Absorbance value measured in well to which drug is applied

Cell viability (%)=$B/A \times 100$

Graphing: The calculated values were graphed using the GraphPad Prism application. The statistical significance of the obtained values was identified via one-way ANOVA with Dunnett's multiple comparison test. The significance of * $p<0.05$  $p<0.01$, * $p<0.001$ vs. control is indicated. The cell viability obtained according to the above calculation method is shown in FIG. 9 as a graph based on the concentration of each of the compound Gd-RB and Gadovist.

5)-(2). Experiment Result

Figure 9:
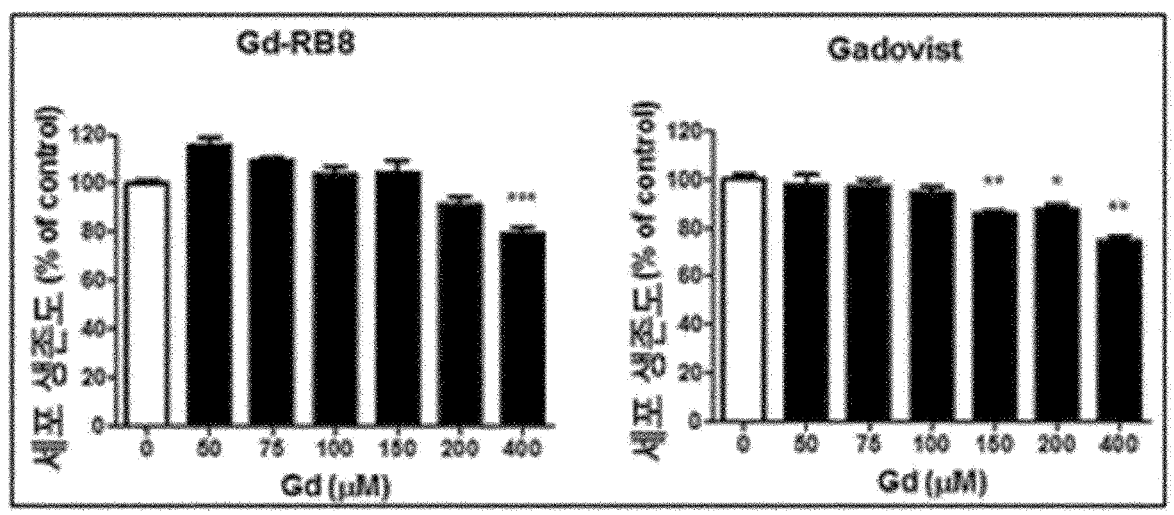
FIG. 9 is a graph showing a cell viability based on a concentration of each of the compound Gd-RB and the Gadovist.

Referring to FIG. 9, when SH-SY5Y cells were treated with each of the compound Gd-RB and Gadovist at different concentrations, cell viability in the both groups as measured were similar to each other. Thus, it was identified that the cytotoxicity of the compound Gd-RB according to the present disclosure is similar to that of the commercial contrast agent.

Although the above disclosure has been described with reference to a preferred embodiment of the present disclosure, those skilled in the art may variously modify the present disclosure within the scope not departing from the spirit and scope of the present disclosure described in the claims below.

What is claimed is:

1. A gadolinium-based compound represented by a following Chemical Formula 1:

[Chemical Formula 1]

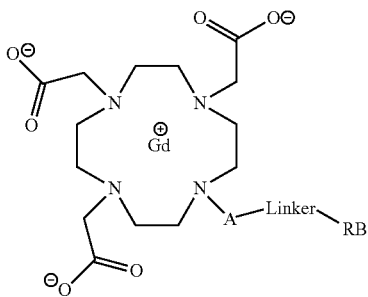

wherein in the Chemical Formula 1,
A represents *—(CH$_2$)$_n$-A$^1$-*,
n represents any integer from 0 to 5,
A$^1$ represents *—COO—*, *—CO—*, *—NR$^1$—*, *—CH$_2$—*, *—CONH—*, or *—O—*,
Linker represents *-L$^1$-NHCO-L$^2$-*, *-L$^1$-O—R$^2$—O-L$^2$-*, *-L$^1$-CH$_2$-L$^2$-*, *-L$^1$-NR$^3$-L$^2$-* or *-L$^1$-COO-L$^2$-*,
each of L$^1$ and L$^2$ independently represents linear or branched (C1-C30)alkyl,
each of R$^1$ and R$^3$ independently represents hydrogen or linear or branched (C1-C10)alkyl,
R$^2$ represents linear or branched (C1-C20)alkyl,
RB represents a following Chemical Formula 2:

[Chemical Formula 2]

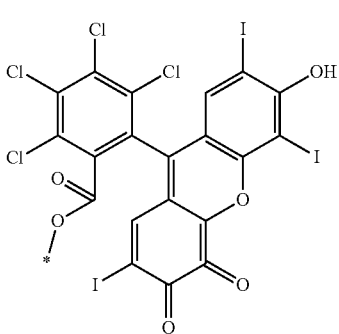

* indicates a connection site,
wherein the gadolinium-based compound is capable of binding vesicular glutamate transporter (VGLUT).

2. The gadolinium-based compound of claim 1, wherein n represents any integer from 1 to 5, and A1 represents *—CONH—*.

3. The gadolinium-based compound of claim 1, wherein L$^1$ represents linear or branched (C1-C10)alkyl, and L$^2$ represents linear or branched (C2-C20)alkyl.

4. The gadolinium-based compound of claim 1, wherein the gadolinium coordinates with at least one water molecule.

5. The gadolinium-based compound of claim 1, wherein the compound specifically binds to mammalian vesicular glutamate transporter (VGLUT).

6. An MRI contrast agent comprising the gadolinium-based compound of claim 1.

7. The MRI contrast agent of claim 6, wherein the agent is capable of being used for diagnosis of a degenerative brain disease.

8. The MRI contrast agent of claim 7, wherein the agent is capable of being used for diagnosis of Alzheimer's disease.

9. A method for preparing the gadolinium-based compound of claim 1, the method comprising following steps:
(a) reacting a salt of Rose Bengal with halogen-substituted alkanoic acid to obtain a compound represented by a following Chemical Formula 1-1:

[Chemical Formula 1-1]

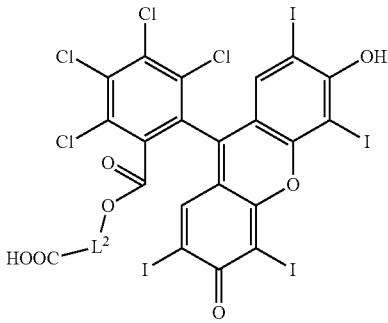

wherein in the Chemical Formula 1-1,
L$^2$ is the same as above defined in the Chemical Formula 1 of claim 1;
(b) reacting the compound of the Chemical Formula 1-1 with a compound represented by a following Chemical Formula 1-2 to obtain a compound represented by a following Chemical Formula 1-3:

[Chemical Formula 1-2]

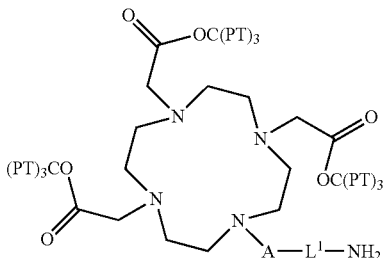

[Chemical Formula 1-3]

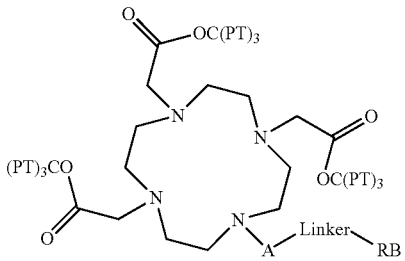

wherein in the Chemical Formulas 1-2 and 1-3,

PT represents a protecting group, each of $L^1$, A, Linker, and RB is the same as defined above in the Chemical Formula 1 of claim 1;

(c) removing the protecting group PT from the compound of the Chemical Formula 1-3; and (d) reacting a compound obtained in the step (c) with gadolinium hydrate to obtain a compound of the Chemical Formula 1 of claim 1.

10. The method of claim 9, wherein in the step (a), the salt of Rose Bengal includes an alkali metal salt of Rose Bengal, and the halogen-substituted alkanoic acid is derived from a linear or branched (C1-C30)alkane and is substituted by one halogen.

11. A method of labeling mammalian vesicular glutamate transporter (VGLUT) in a sample and/or a subject for the diagnosis of degenerative brain diseases, the method comprising administering the compound of claim 1 to the sample and/or the subject.

12. The method of claim 11, wherein the subject is a human.

13. The method of claim 11, wherein the compound is administered in a liquid composition that comprises the compound and a liquid.

14. The method of claim 13, wherein the liquid comprises water.

15. The method of claim 13, wherein the liquid comprises dimethyl sulfoxide (DMSO).

16. The method of claim 11, wherein the sample is from an animal that has been diagnosed with a degenerative brain disease and/or wherein the subject has been diagnosed with a degenerative brain disease.

17. The method of claim 11, wherein the sample is from an animal that has been diagnosed with a risk of degenerative brain disease and/or wherein the subject has been diagnosed with a risk of degenerative brain disease.

18. The MRI contrast agent of claim 6, wherein the agent further comprises a liquid and the agent is a liquid capable of being injected into a sample and/or a subject.

19. The MRI contrast agent of claim 18, wherein the liquid comprises water.

20. The MRI contrast agent of claim 19, wherein the liquid comprises dimethyl sulfoxide (DMSO).

* * * * *